UNITED STATES PATENT OFFICE.

AUGUSTIN CLÉRY, OF LONDON, ENGLAND.

COMPOSITION OF MATTER FOR ARTIFICIAL STONE.

SPECIFICATION forming part of Letters Patent No. 568,239, dated September 22, 1896.

Application filed September 26, 1895. Serial No. 563,721. (No specimens.) Patented in England September 7, 1893, No. 16,840.

*To all whom it may concern:*

Be it known that I, AUGUSTIN CLÉRY, a citizen of the French Republic, residing at 143 Shaftesbury Avenue, London, in the county of London, England, have invented a new and useful composition of matter to be used as a preservative composition, applicable also for the manufacture of artificial stone, statuary, and the like, (for which I have obtained a patent in Great Britain, No. 16,840, dated September 7, 1893,) of which the following is a specification.

My invention relates to improvements in the manufacture of artificial stone; and it consists of a liquid and of a powder which are mixed together for the purpose of being applied to any surface requiring to be provided with a protective damp-proof coating, covering, or layer imitating stonework. The same substance is likewise utilized for casting or molding statues, vases, ornaments, and other articles or objects, and for repairing stone and marble works, pieces or parts or objects of every description.

In carrying my invention into practice I prepare a liquid containing the following ingredients mixed in the proportions indicated, viz: (1) Muriatic acid, forty parts; tin, thirty parts; sal-ammoniac, thirty parts; total, one hundred parts.

The tin is first dissolved in the acid, after which the sal-ammoniac is incorporated in small pieces in the mixture.

I further prepare a powder containing the following ingredients mixed in the proportions indicated, viz: (2) Pulverized freestone, fifty parts; zinc oxid, twenty parts; pounded glass, fifteen parts; powdered marble, ten parts; calcined magnesia, five parts; total, one hundred parts.

The above ingredients are intimately mixed and passed through a fine sieve, so as to form a powder, which is reduced to a pasty consistency with the above liquid, (1,) this paste being applied with a trowel to the surface (building-front inner, or outer wall) which is to receive a damp-proof covering, layer, or coating. After a very short space of time this paste becomes very hard and assumes the appearance of stone, and after being well set it is as hard as flint and has a smooth polished surface, which can be rapidly painted, if required, in the ordinary way, or I may mix any suitable coloring material, dye, or pigment with the above powder, (2,) so as to impart to the hardened coating either a plain color or marbled, veined, or motley surface.

Although the above proportions for (1) and (2) are the best to my knowledge, it is obvious that I may slightly alter them without departing from the nature of my invention.

This covering material is particularly applicable for walls in basements, cellars, and other similar places which are liable to be damp, as well as for lining cisterns, pits, and the like. In short, it can be used as a damp-proof coating under any circumstances for covering wood, metal, and the like, as well as stonework, brickwork, masonry, and the like. I also use the said material for covering the front, sides, rear, or other parts of buildings, so as to imitate stone, while obtaining a damp-proof, hard, and practically impenetrable surface.

The above material or paste may be further utilized for repairing and restoring more or less dilapidated churches, mansions, and other buildings, statues, columns, vases, and other ornaments or pieces of stone and marble, and generally for all casting and molding purposes for which plaster-of-paris is generally used, my improved paste being manipulated in exactly the same manner as the latter.

In all cases the paste is only made when required for immediate use.

What I claim, and desire to secure by Letters Patent of the United States, is—

A composition of matter for the purposes described consisting of a powder composed of pulverized freestone fifty parts, zinc oxid twenty parts, powdered glass fifteen parts powdered marble ten parts, and calcined magnesia five parts and a liquid composed of muriatic acid forty parts, tin thirty parts and sal-ammoniac thirty parts substantially as herein described.

AUGUSTIN CLÉRY.

Witnesses:
  G. A. DE KATOW,
  L. LOWLES.